Dec. 16, 1969    A. E. BREED ET AL    3,484,803
WHEEL RAKE
Filed Jan. 18, 1968
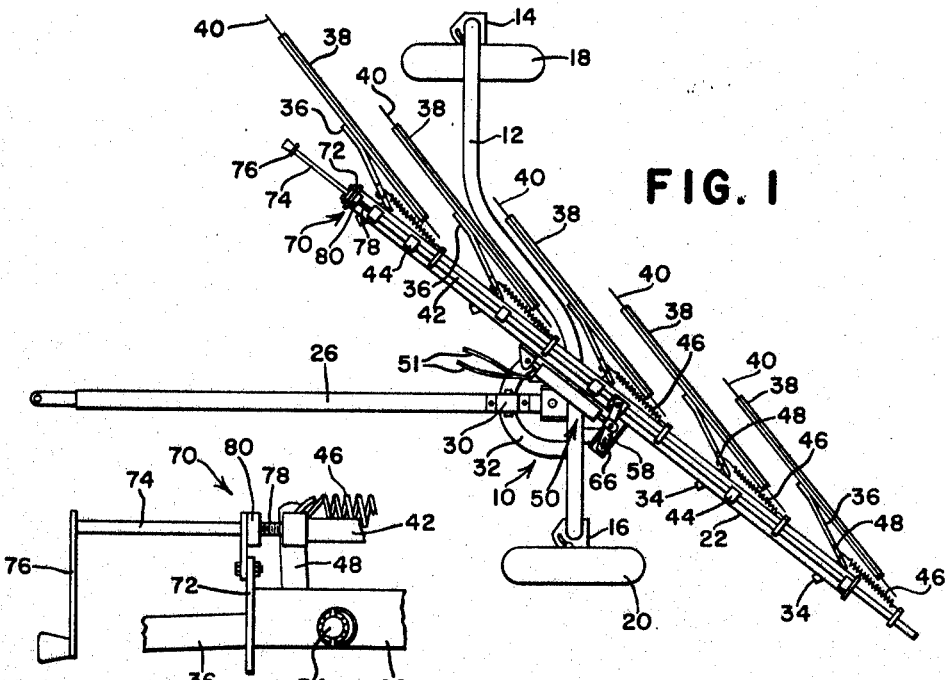
INVENTORS
A. E. BREED
R. F. BILLHYMER

United States Patent Office 3,484,803
Patented Dec. 16, 1969

3,484,803
WHEEL RAKE
Arie Eugene Breed and Robert Franklin Billhymer, Ottumwa, Iowa, assignors to Deere & Company, Moline, Ill., a corporation of Delaware
Filed Jan. 18, 1968, Ser. No. 698,759
Int. Cl. A01d 77/06
U.S. Cl. 56—377          4 Claims

ABSTRACT OF THE DISCLOSURE

A pull-type, rotary wheel, side delivery rake having a mobile main frame including a horizontal beam extending obliquely relative to the direction of travel, an echelon of rotary rake wheels on vertically swingable lever arms pivotally mounted on the beam, the position of the lever arms being controlled by an axially slidable rod mounted above the beam and connected to the lever arms by tension springs, the axial position of the rod in turn being controlled by a hydraulic cylinder operative between the beam and a central portion of the rod, an adjustable stop being provided at one end of the rod to limit the downward movement of the wheels.

BACKGROUND OF THE INVENTION

This invention relates to rotary wheel type side delivery rakes, and more particularly to improved means for controlling the vertical position of the rake wheels.

It is known to mount the individual rake wheels on a side delivery rake on separate vertically swingable lever arms to permit independent vertical adjustment of the individual rake wheels to a limited degree so that the individual wheels may follow the contour of the ground, and further to provide spring means for partially counterbalancing the weight of each wheel. It is also known to provide means for vertically adjusting the rake wheels in unison so that the rake wheels may be simultaneously raised to transport position or lowered into operating position and further to provide an elongated axially shiftable rod connected to the rake wheel mounting lever arms through the counterbalancing springs, so that axial shifting of the rod vertically adjusts the rake wheels in unison while the deflection of the counterbalance springs permits independent vertical adjustment of the individual wheels.

Heretofore, the axial shifting of the control rod in many of such rakes has been accomplished by a hydraulic cylinder disposed at the end of the control rod or alternately a manually operated crank at the end of the rod. Thus, a rake equipped with such a hydraulic cylinder for raising and lowering the rake wheels could only be operated with a tractor equipped with means for operating such a remote hydraulic cylinder and in the event of a failure in the tractor hydraulic system, the rake wheels could not be raised or lowered. Also, the location of the hydraulic cylinder at the end of the control rod has meant that the cylinder, and its associated hydraulic lines, have been substantially offset from the draft member of the rake so that the hydraulic lines between the cylinder and the tractor have been exposed and more susceptible to damage. In addition, on most wheel rakes provision is made for the addition of rake wheels at both ends of the echelon of rake wheels to vary the width of the swath raked by the machine. The location of the cylinder at the end of the control rod has complicated the addition or removal of a rake wheel at the end of the echelon at which the cylinder is mounted. Also, it is desirable to vary the operating height of the rake wheels in some circumstances and when a hydraulic cylinder is used to control the height of the raking wheels, it is difficult to finely adjust the height and also difficult to return the wheels to a preselected height after they are temporarily raised.

To overcome the above disadvantages associated with mounting the lift cylinder at the end of the control rod, in some wheel rakes the lift cylinder has been disposed adjacent a central portion of the rod proximate to the connection between the fore-and-aft draft member and the oblique beam on which the wheels are mounted. However, in such rakes wherein the lift cylinder extends adjacent and parallel to the control rod, one end of the cylinder has been rigidly attached to the frame while the other end has been rigidly attached to the rod and since the force exerted by the cylinder on the rod is in a direction parallel to and offset from the axis of the rod, the force exerted by the cylinder produces a moment on the rod, which tends to distort the rod, unless the strength of the rod is increased to a sufficient degree that it will not deflect under said moment. Also, since such lift cylinders have been optional attachments, the control rod on standard rakes being shifted by a crank at one end of the rod, the addition of the lift cylinder has necessitated the removal of the crank at the end of the rod so that the cylinder is the sole means of controlling the position of the rake wheels, resulting in the previously described disadvantages.

SUMMARY OF THE INVENTION

According to the present invention, improved means are provided for mounting a lift cylinder adjacent a central portion of the control rod. More specifically, a linkage arrangement is provided connecting the lift cylinder to the control rod so that only an axial force is exerted on the rod, the elimination of the moment on the rod permitting the use of a relatively light rod, thereby reducing the cost and the weight of the machine.

Another feature of the invention resides in the provisions of an adjustable stop at the end of the rod to selectively establish the lower or operating position of the rake wheels. Still another feature of the invention resides in the fact that the adjustable stop can also be utilized to raise and lower the rake wheels in the event that the rake is not equipped with the optional lift cylinder or in the event that the cylinder is inoperative due to a hydraulic failure or due to the fact that the rake is being towed by a tractor that is not equipped to operate the cylinder.

BRIEF DESCRIPTION OF THE DRAWINGS

FIG. 1 is a somewhat schematic plan view of a rake embodying the present invention.

FIG. 2 is an enlarged upper front perspective of the mid-portion of the rake, showing the details of the lift cylinder mounting on the rake.

FIG. 3 is an enlarged side view of the forward end of the obliquely extending beam, on which the rake wheels are mounted, showing the adjustable stop.

DESCRIPTION OF THE PREFERRED EMBODIMENT

The invention is embodied in a side delivery rake having a mobile, generally X-shaped main frame, indicated in its entirety by the numeral 10. The main frame 10 includes transverse tubular member 12 having right and left wheel support structures 14 and 16 respectively mounted at the lower ends of its opposite depending legs, the wheel support structures respectively journaling right and left ground-engaging wheels 18 and 20. As shown in FIG. 1, the wheel support structures are swingable on the transverse member 12 about a vertical axis so that the line of advance of the machine may be varied to decrease the overall width of the machine for transport, the wheels being positioned for normal operation of the rake in FIG. 1. It is to be understood that the terms "right," "left," "forwardly," and "rearwardly" are with respect to a person facing the line of advance of the machine (to the left in FIG. 1) and that such terms as well as terms such as "transverse," "upwardly," and "downwardly" are terms of convenience used to more clearly define the invention.

A generally horizontal box-type beam 22 is mounted on and intersects the transverse member 12, the beam 22 extending obliquely relative to the direction of machine travel when the wheels 16 and 18 are in their operating position, the intersecting transverse member 12 and beam 22 providing the X-shaped main frame. The beam 22 is rigidly attached to the transverse member 12 through appropriate brackets 24. A generally fore-and-aft extending draft member 26 extends forwardly from the transverse member 12 adjacent the intersection of the member 12 and the beam 22, the draft member being connected to the transverse member 12 for horizontal adjustment about a vertical pivot at its rearward end. The angular position of the draft member 26 about its pivot is established by means of removable pins 28, which connect a C-shaped strap 30 on top of the draft member 26 to a forwardly extending horizontal generally C-shaped brace 32 having its opposite ends attached to the transverse member 12, the C-shaped brace being generally concentric with the vertical draft member pivot and being slidable within the opening between the strap 30 and the draft member 26 to permit swinging of the draft member. The pins 28 are insertable into alternate vertical holes in the C-shaped brace to engage the opposite sides of the strap 30 and thereby releasably lock the draft member in its selected angular position.

A plurality of horizontal stub shafts or pivots 34 are mounted at equal intervals along the beam 22, the axis of the pivots being parallel and extending obliquely relative to the direction of travel and also somewhat obliquely relative to the beam 22. A lever arm 36 is mounted on each pivot 34 for swinging in a vertical arc about its rearward end, each lever arm journaling a rake wheel 38 at its forward end so that the rake wheels 38 are vertically adjustable about the pivots 34. In the illustrated embodiment, an echelon of five rake wheels are provided at equal intervals along the beam 22, the rake wheels being of conventional construction and including a large number of radially extending teeth or tines 40 around their outer periphery. The rake wheels 38 are disposed in a generally overlapping relationship and as the rake advances, the rake tines 40 engage the ground, causing the wheels to rotate, the rotation in turn laterally displacing the crop lying on the ground.

An elongated control rod 42 is mounted above and parallel to the beam 22 on a number of journals 44 projecting upwardly from the beam 22, the journals permitting axial movement of the rod parallel to the beam 22. The control rod is substantially coextensive with the beam and is connected to each rake wheel lever arm 36 through a generally horizontal tension spring 46, each spring 46 having its rearward end connected to the rod 42 and its forward end connected to the upper end of a generally upright arm 48 extending upwardly from the respective lever arms 36 between the rake wheel journal and the arm pivot 34. The arms 48 and the lever arms 36 essentially form a bell crank, so that the rearward force exerted by the springs 46 bias the lever arms 36 and their associated rake wheels 38 upwardly. When the wheels are raised from the ground, the springs 46 support the entire weight of the wheels, and when the wheels are lowered to operating position, wherein they engage the ground, the springs partly counterbalance the weight of the wheels.

Extending parallel to and alongside the beam 22 above the juncture of the member 12 and the beam 22 is a two-way hydraulic ram 50 connected to and remotely actuatable through the hydraulic system of the draft vehicle through hydraulic lines 51. The hydraulic ram 50 includes a hydraulic cylinder 52, attached to the beam 22 by a mounting bracket 54, and an extendable and retractable piston 56 connected to the control rod 42 through a generally horizontal lever 58. The lever 58 is connected to the rod through a vertical pivot 60 carried by a yoke 62 at one end of the lever, the piston 56 being pivotally connected to a central portion of the lever via a vertical pivot 64. The other end of the lever 58 is swingably mounted on a vertical pivot 65 carried by a support bracket 66 rigidly projecting from the side of the beam 22, the lever 58 being provided with an elongated slot 68 which receives the pivot 65 so that the end of the lever connected to the rod moves in a straight line along the axis of the rod as the lever swings. Thus, only an axial force is exerted on the control rod 42.

An adjustable stop, indicated in its entirety by the numeral 70, is mounted at the forward end of the beam 22 and operates to limit the forward movement of the rod 42. The adjustable stop 70 is formed by an upright bracket 72 rigidly attached to the forward end of the beam 22 and provided with an aperture coaxial with the rod 42. A shaft 74 slidably and rotatably extends through the aperture in the bracket 72 coaxial with the rod 42 and is provided with a crank arm 76 at its forward end, the rearward end of the shaft 74 being connected to the rod 42 through a helical thread 78, only the externally threaded portion of the shaft 74 being shown in the drawings, the internally threaded bore on the rod 42 receiving the threaded end of the shaft in the conventional manner, whereby rotation of the shaft 74 axially shifts the shaft relative to the rod. The shaft 74 is also provided with a shoulder or abutment 80, which is engageable with the rear side of the bracket 72 to limit the forward movement of the shaft.

In operation, to raise the rake wheels to transport position, the hydraulic ram 50 is actuated to extend the piston 56, thereby shifting the rod 42 rearwardly, the rearward motion of the rod 42 being transmitted to the upright arms 48 through the springs 46, causing the levers 36 to rock about the pivots 34 and thereby raise the rake wheels 38 in unison. As previously described, the connection of the piston 56 to the rod 42 is accomplished through a linkage which exerts only an axial force on the rod 42, eliminating a moment or couple on the rod.

To lower the rake wheels, the piston 56 is retracted, permitting the rod 42 to shift forwardly so that the rake wheels lower. In normal operation, the hydraulic ram is retracted until the rake wheels contact the ground and are at least partially supported on the ground. However, most of the weight is preferably supported by the springs 46 so that the rake wheels will individually swing upwardly upon striking an obstruction. Also, each wheel is free to independently swing downwardly into any depression until the extension of its spring is such that the spring supports the entire weight of the wheel.

When the rod 42 is shifted rearwardly, the shaft 74 slides freely through the aperture in the bracket 72. However, as the wheels are lowered, the rod 42 will shift forwardly only until the shoulder or abutment 80 on the shaft 74 engages the rearward side of the bracket 72, thereby limiting the maximum forward position of the rod 42 and the downward movement of the rake wheels. This maximum forward position of the rod can be varied by rotating the shaft 74 via the crank 76, threading the shaft 74 inwardly or outwardly relative to the rod 42 and thereby changing the distance between the shoulder 80 and the end of the rod 42. Thus, the stop means 70 can be adjusted to provide the optimum operating position of the rod 42 and the operator can raise and lower the rake wheels via the hydraulic ram 50 at frequent intervals without being concerned about returning the wheels to their optimum operating position, the ram 52 simply being retracted until the shoulder 80 engages the bracket 72.

The adjustable stop 70 also provides a means for manually raising and lowering the rake wheels in the event that the hydraulic ram is inoperative for any reason or in the event that the hydraulic ram is provided as an option and the purchaser of the rake does not desire the added convenience and expense of the hydraulic ram. When the hydraulic ram is disconnected or removed, the weight of the rake wheels will urge the rod 42 forwardly, forcing the abutment 80 on the shaft 74 against the stop formed by the bracket 72. Rotation of the shaft 74 via the crank arm 76 in one direction will force the rod 42 rearwardly, increasing the distance between the shoulder 80 and the end of the rod 42, the rearward motion of the rod 42 raising the wheels. Conversely, rotation of the shaft 74 in the opposite direction will permit the rod to shift forwardly to lower the wheels.

To add a rake wheel to the forward end of the echelon of wheels, the bracket 72 is removed from the forward end of the beam 22 and the shaft 74 is threaded from the forward end of the rod 42, whereupon an additional section of beam 22 is attached to the forward end of the beam, and an additional rake wheel and its associated mounting mechanism is connected to the beam extension. An additional length of rod 42 is threaded onto the forward end of the rod, the new length of rod being provided with a similar threaded bore adapted to receive the shaft thread 78, whereupon the bracket 72 is again mounted on the forward end of the added beam section and the shaft 74 is threaded into the forward end of the added rod section. Of course, additional rake wheels can be similarly added to the rearward end of the echelon, eliminating the removal and mounting of the adjustable stop.

What is claimed is:

1. In a rotary wheel type side delivery rake having a mobile main frame adapted to move in a predetermined direction and including a generally horizontal beam extending obliquely relative to said predetermined direction of travel, an echelon of obliquely disposed rotary raking wheels, an elongated rod disposed generally parallel to the beam and mounted for axial shifting thereon, and means operative between the rod and the raking wheels for vertically adjusting the raking wheels relative to the ground in response to axial movement of the rod, the improvement comprising: a hydraulic motor means mounted on the frame and having a movable element actuatable in opposite directions, means operatively connecting the movable element to the rod intermediate its ends for axially shifting the rod in opposite directions in response to movement of the element in opposite directions, and an adjustable stop means operatively associated with the rod for limiting the movement of the rod in the direction that permits downward adjustment of the raking wheels.

2. The invention defined in claim 1 wherein the adjustable stop means is associated with one end of the rod and includes a support member mounted on the beam and having a bore coaxial with the rod, a crank means having a rotatable shaft axially shiftable and rotatable in the bore, thread means connecting the shaft and rod whereby rotation of the shaft axially shifts the rod relative to the shaft, and abutment means on the shaft engageable with the support member to limit the axial shifting of the shaft and the rod connected thereto only in the direction which permits downward adjustment of the raking wheels, rotation of the shaft in one direction when the abutment means is in engagement with the support member shifting the rod in a direction which effects raising of the wheels.

3. The invention defined in claim 2 wherein the hydraulic motor means comprises a hydraulic ram having a reciprocatable piston movable in a direction generally parallel to the axis of the rod, and the connecting means between the rod and the piston includes a bracket attached to and projecting generally horizontally from the beam, and a lever arm having one end pivotally mounted on the bracket for swinging about a vertical pivot and the other end connected to the rod, the piston being connected to the lever arm between the opposite ends of the lever arm and adapted to swing the arm in response to movement of the piston.

4. In a rotary wheel type side delivery rake having a mobile main frame adapted to move in a predetermined direction and including a generally horizontal beam extending obliquely relative to said predetermined direction of travel, an echelon of obliquely disposed rotary raking wheels, an elongated rod disposed generally parallel to the beam and mounted for axial shifting thereon, and means operative between the rod and the raking wheels for vertically adjusting the raking wheels relative to the ground in response to axial movement of the rod, the improvement comprising: a support bracket attached to and extending from the beam, a lever arm having one end connected to the rod and the other end pivotally connected to the bracket, said one end of the lever arm being movable in the same general direction as the axial shifting movement of the rod, and a hydraulic ram having one end mounted on the frame and the other end connected to the lever arm between its ends and actuatable to swing the lever arm about its pivot and axially shift the rod.

References Cited

UNITED STATES PATENTS

| 2,861,412 | 11/1958 | van der Lely et al. | 56—377 |
| 2,975,582 | 3/1961 | Pollard | 56—377 |
| 3,145,522 | 8/1964 | Zink | 56—377 |
| 3,406,509 | 10/1968 | Wood | 56—377 |

FOREIGN PATENTS

| 230,670 | 12/1963 | Austria. |
| 1,363,002 | 4/1964 | France. |
| 389,308 | 7/1965 | Switzerland. |

RUSSELL R. KINSEY, Primary Examiner